United States Patent [19]

Kamakura et al.

[11] Patent Number: 5,090,078
[45] Date of Patent: Feb. 25, 1992

[54] OPTICAL DISK STORAGE CONTAINER AND CLEANER

[75] Inventors: Kunihito Kamakura; Seiichi Ohta; Chihiro Aoki, all of Hyogo; Seitaro Hamano, Osaka; Yasushi Hiramatsu, Hyogo, all of Japan

[73] Assignee: Daicel Chemical Industries, Ltd., Osaka, Japan

[21] Appl. No.: 528,376

[22] Filed: May 25, 1990

[30] Foreign Application Priority Data

Sep. 12, 1989 [JP] Japan ............... 1-107098[U]
Sep. 13, 1989 [JP] Japan ............... 1-107645[U]

[51] Int. Cl.$^5$ ............... G11B 3/58; B08B 11/02
[52] U.S. Cl. ............... 15/97.1; 15/210 R; 15/268; 206/310; 206/472; 360/137; 369/72; 369/273
[58] Field of Search ............... 15/97.1, 88.1, 88.2, 15/100, DIG. 14, 268, 210 R; 206/309-312, 387, 444, 472, 473; 369/72, 77.2, 273, 282, 290, 291; 360/128, 133, 137

[56] References Cited

U.S. PATENT DOCUMENTS

| 4,520,470 | 5/1985 | d'Alayer de Costemore d'Arc | 360/137 X |
| 4,569,098 | 2/1986 | Kawabe | 206/309 X |
| 4,654,917 | 4/1987 | Yeung | 15/97.1 |
| 4,688,206 | 8/1987 | Nakagawa et al. | 369/273 X |
| 4,709,437 | 12/1987 | Hehn et al. | 15/97.1 |
| 4,713,856 | 12/1987 | Clausen | 15/97.1 |
| 4,750,231 | 6/1988 | Kogashiwa | 369/72 X |
| 4,851,948 | 7/1989 | Kato et al. | 360/133 |
| 4,854,001 | 8/1989 | Mannheimer et al. | 15/97.1 |

FOREIGN PATENT DOCUMENTS

| 168642 | 1/1986 | European Pat. Off. | 369/72 |
| 248276 | 11/1986 | Japan | 369/72 |
| 251986 | 10/1988 | Japan | 369/72 |

Primary Examiner—Harvey C. Hornsby
Assistant Examiner—C. Cooley

[57] ABSTRACT

A book case type optical disk storage container adapted to house a cartridge type optical disk with its shutter opened, the container being characterized in that one storage surface of the container is provided with a shutter stopper for keeping the shutter open, and a projection for supporting an optical disk base rotatably, and the other storage surface being provided with a disk rotating jig and a disk base cleaning device. A structure for preventing the dislocation of a spring is provided in the optical disk cartridge wherein a shutter is opened and closed in accordance with a sliding movement of a sliding jig provided in the inner portion of the shutter and joined to the spring contacting portions of cartridge case via a spring. The spring contacting portions of the cases consist of the surfaces of a contacting wall, and upper and lower walls extending from the contacting wall, the lower wall being provided with a spring dislocation preventing projection.

7 Claims, 3 Drawing Sheets

OPTICAL DISK STORAGE CONTAINER AND CLEANER

This invention relates to a storage container used to carry a cartridge type optical disk, and more particularly to a storage container capable of being used to carry a cartridge type optical disk conveniently, and clean an optical disk base simply during the transportation of the disk.

This invention also relates to a structure for preventing the dislocation of a spring in an optical disk cartridge.

BRIEF DESCRIPTION OF DRAWINGS

The present invention will become more fully understood from the detailed description given hereinbelow and the accompanying drawings which are given by way of illustration only, and thus, are not limitative of the present invention, and wherein.

1 . . . cartridge type optical disk, 2 . . . cartridge body, 3 . . . disk base, 4 . . . shutter 5 . . . central bore, 6 . . . hub, 7 . . . storage container, 8 . . . storage surface, 9 . . . shutter stopper, 10 . . . disk base rotating projection, 11 . . . storage surface, 12 . . . disk rotating jig, 13 . . . cleaner.

Figure 3:
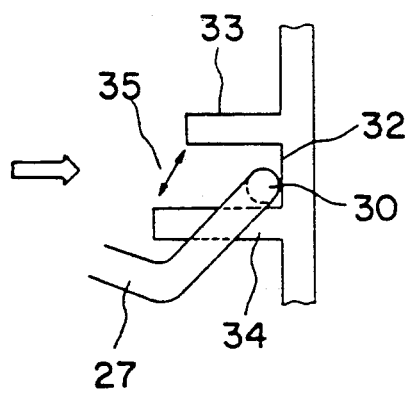
Figure 4:
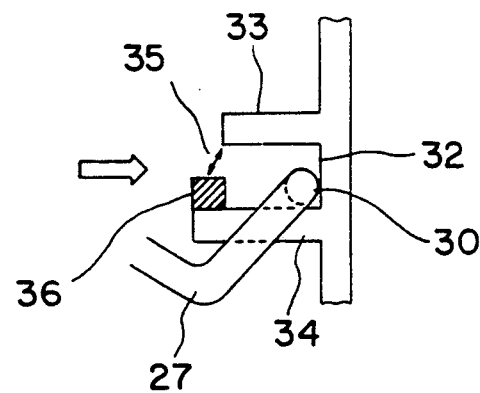
Figure 5:
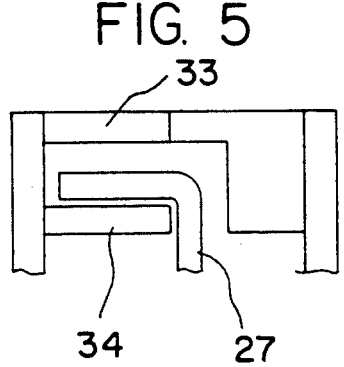
Figure 6:
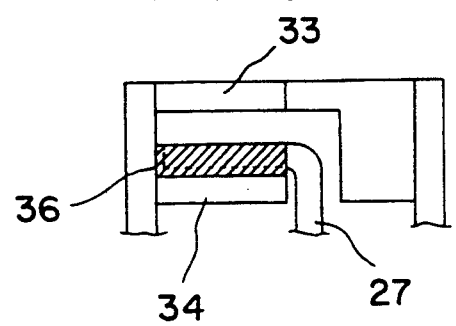
Figure 7:
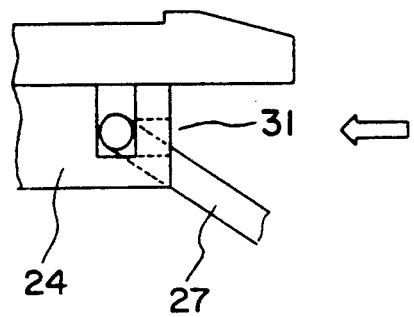
Figure 8:
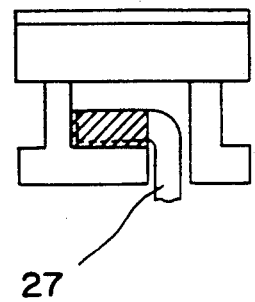
Figure 9:
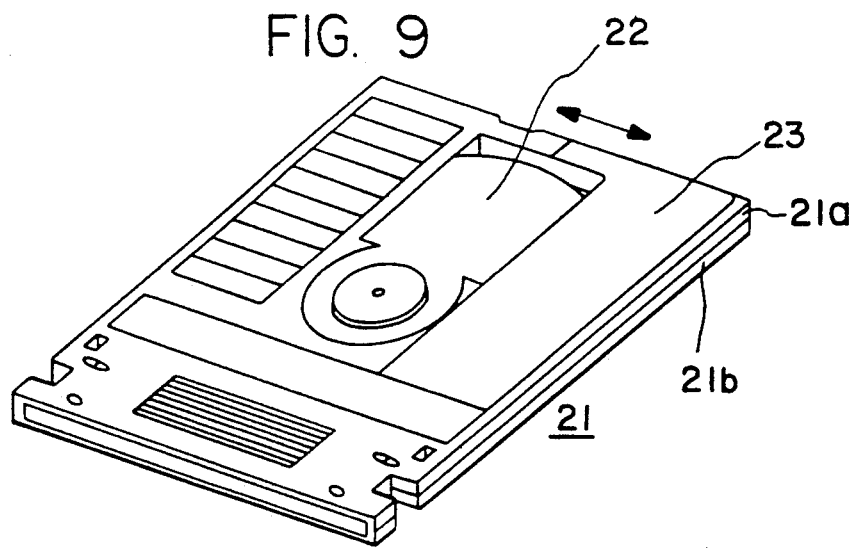

FIG. 3 is a plan view showing the construction of a spring contacting portion of a conventional optical disk cartridge;

FIG. 4 is a plan view showing the construction of a spring contacting portion of the disk cartridge according to the present invention;

FIGS. 5 and 6 show the condition of these spring contacting portions viewed in the direction of arrows in (from the left-hand side of) FIGS. 3 and 4, respectively;

FIG. 7 is a plan view showing the construction of the spring contacting portion of a sliding jig;

FIG. 8 shows the condition of the spring contacting portion of the sliding jig viewed in the direction of an arrow in (from the right-hand side of) FIG. 7;

FIG. 9 is a perspective view of an optical disk cartridge; and

Figure 10:
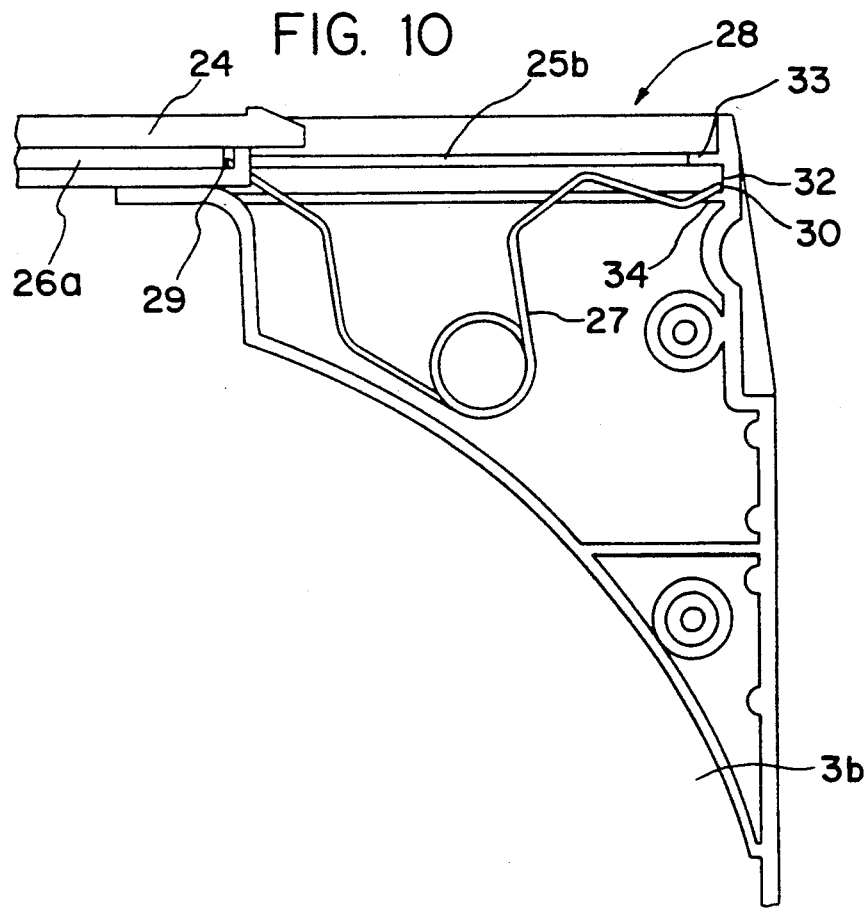

FIG. 10 is a plan view showing a sliding portion of the optical disk cartridge.

21 . . . optical disk cartridge, 21a, 21b . . . cartridge cases, 22 . . . disk base, 23 . . . shutter, 24 . . . sliding jig, 25b . . . rails (only one rail being shown), 26a grooves in which the jig slides (only one groove being shown), 27 . . . spring, 28 . . . opened surface of a sliding portion of the case, 29, 30 . . . free end of the spring, 31 . . . free end of the sliding jig, 32 . . . contacting surface of the case, 33 . . . upper wall, 34 . . . lower wall, 35 . . . opening, 36 . . . dislocation preventing projection.

DESCRIPTION OF THE BACKGROUND ART

Figure 1:
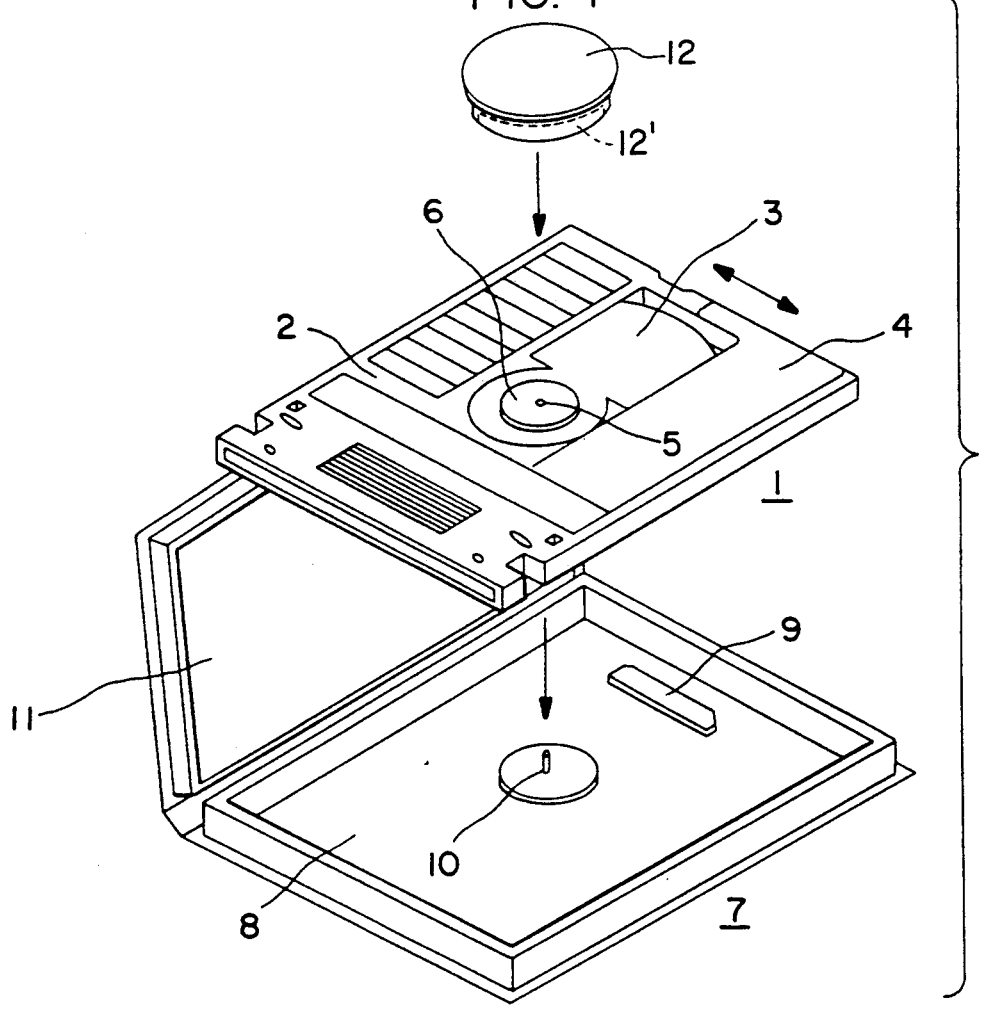
FIG. 1 is a perspective view showing the condition of the storage container for optical disks according to the present invention in practical use.

An optical disk protecting container consisting of a cartridge type container has recently been used. In this container, an optical disk base 3 is housed in a cartridge body 2 as shown in FIG. 1, and the disk base 3 is not normally exposed. The disk protecting container is formed so that, when it is inserted into a reader, a shutter 4 provided on the cartridge body 2 is opened manually or automatically to cause a part of the disk base 3 to be exposed. In such a cartridge type container, the optical disk is protected to a certain extent. In order to more safely protect the optical disk, a suitable storage container capable of housing a cartridge type optical disk therein and carrying the same conveniently may be developed but such a storage container has not yet been put on the market.

An optical disk is formed so that a laser beam passed through a lens and a base of a plastic (mainly polycarbonate) is condensed on the surface of a recording medium, the controlling of an optical system or the reading of information being done in accordance with the variation of the quantity of the reflected light. When dust is deposited on the surface of the base in use, or, when the surface of the base in use has a flaw, the quantity of the reflected light does not accurately vary due to the influence thereof. Also, the driving of the disk cannot be controlled properly.

Therefore, a cleaner for removing the dust deposited on the base surface becomes necessary. A conventional optical disk cartridge uses a very large-scale dust removing device. A means capable of removing dust from the base surface is simply not known at all at present.

An optical disk protecting container consisting of a cartridge type container has recently been used. In this container, an optical disk base 22 is housed in a cartridge 21 as shown in FIG. 9, and the disk base 22 is not normally exposed. The disk protecting container is formed so that, when it is inserted into a reader, a shutter 23 provided on the cartridge 21 is opened manually or automatically to cause a part of the disk base 22 to be exposed. The opening and closing of the shutter 23 are done in accordance with the lateral movements of a sliding jig joined to an inner portion of the shutter 23. To be more precise, the cartridge 21 consists of two cases 21a, 21b (cases on the sides of A and B surfaces) molded in substantially the same shape, as shown in FIGS. 9 and 10. One side of the cases 21a, 21b on which slide portions are formed is provided with rails. Only one rail 25b is shown in FIG. 10. The slide jig 24 constituting another member is provided with jig sliding grooves. In FIG. 16, only one groove 26a is shown. The size of these grooves is in agreement with that of the rails 25b, and the sliding jig 24 is slidably held between the cases 21a, 21b. The sliding jig 24 is joined resiliently to the spring contacting portions of the cartridge cases via a spring 27 so that the opening and closing of the shutter 23 are thereby controlled. The sliding jig 24 is normally in the condition shown in FIG. 10, with the shutter closed.

In order to produce the optical disk cartridge, the sliding jig 24 is held between the cases 21a, 21b first as described above. After the cartridge is formed by using this step, a spring 27 the free end portions of which are bent at right angles so as to increase the contact surface area thereof is inserted thereinto from the opened surfaces 28 of the sliding portions of the cases.

In a conventional cartridge of this kind, the spring 27 is engaged at its free end portions 29, 30 with a free end portion (contacting portion) 31 of the sliding jig 24 and the contacting surfaces 32 of the cases. Dislocation of the spring 27 is prevented by only the resilient force thereof.

An optical disk is originally a precision product and should be handled as carefully as possible. When the optical disk is handled normally, the spring does not come off even if the spring is formed as mentioned above but, when the cartridge is dropped by mistake, the spring comes off in some cases due to the impact of the dropped cartridge. When the spring comes off, the shutter opening means naturally becomes unserviceable, so that it becomes necessary to open the screwed cartridge cases and set the spring again. This requires considerable labor.

SUMMARY OF THE INVENTION

This invention relates to a book case type optical disk storage container adapted to house a cartridge type optical disk with its shutter opened, the container being characterized in that one storage surface of the container is provided with a shutter stopper for keeping the shutter open and a projection for supporting an optical disk base rotatably.

This invention further relates to a structure for preventing the dislocation of a spring in an optical disk cartridge wherein a shutter 23 is opened and closed in accordance with a sliding movement of a sliding jig 24 provided in an inner portion of the shutter and joined to the spring contacting portions of cartridge cases via a spring 27, characterized in that the spring contacting portions of the cases consist of the surfaces of a contacting wall 32 and upper and lower walls 33, 34 which are provided on the contacting wall 32, a spring dislocation preventing projection 36 being provided on the lower wall.

This invention also provides an optical disk storage container provided with the above-described structure for preventing the dislocation of a spring.

The storage container according to the present invention will now be described with reference to the accompanying drawings.

FIG. 1 is a perspective view showing the condition of the optical disk storage container according to the present invention in practical use.

Referring to the drawing, a reference numeral 1 denotes a cartridge type optical disk, and a disk base 3 is protected by a cartridge body 2.

As described previously, the cartridge body 2 is provided with a laterally slidable shutter 4, which is adapted to be opened when the optical disk is used (the reading is started), to cause the base 3 to be exposed.

A reference numeral 7 denotes a book case type container according to the present invention, for storing therein the cartridge type optical disk 1 referred to above.

The cartridge type optical disk 1 is adapted to be housed with its shutter opened in the storage container 7, and one storage surface 8 of the container is provided with a shutter stopper 9 for keeping the shutter open. Since the shutter stopper 9 is adapted to stop the returning of the shutter, it may consist of, for example, an elongated projection the length of which is substantially equal to that of an opening of the cartridge. The shape of this projection is not specially limited.

The storage surface 8 is also provided at the substantially central portion thereof with a projection 10 for rotatably supporting the optical disk base 3. The optical disk base 3 held in the cartridge usually has a hub 6 provided with a central bore 5, and the base rotating projection 10 is formed so as to be fitted in this central bore 5.

In the storage container according to the present invention thus constructed, the optical disk is housed rotatably with the surface thereof exposed. Therefore, if the base surface is wiped with a suitable cleaning means as the disk is turned with the hub portion of the optical disk base held by hand, the dust deposited on the base surface can be removed easily.

In order to turn the disk more easily during such a base surface cleaning operation, for example, a disk rotating jig 12 having a hollow shape 12' so as to be fitted around the projecting hub 6 is conveniently used. The construction of the disk rotating jig 12 is not specially limited. Especially, a disk rotating jig formed to the smallest possible dimensions and provided with a magnet therein can be conveniently used.

Figure 2:
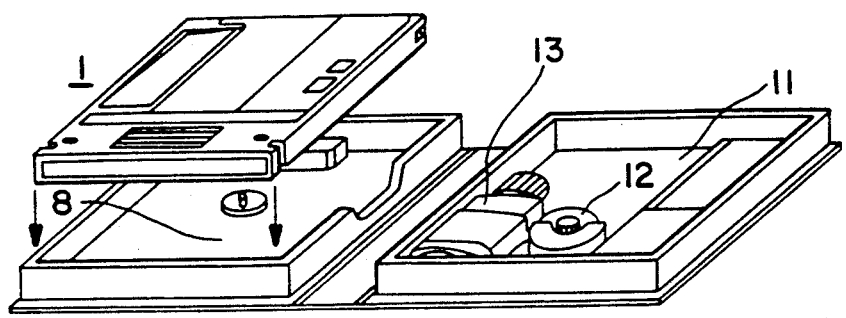
FIG. 2 is a perspective view of another embodiment of the storage container for optical disk according to the present invention.

The cleaning means usable for removing the dust include paper, a cloth, an unwoven cloth and a sponge. Especially, a cloth consisting of polyester fiber is preferably used. It is desirable that a cleaning means impregnated with an aqueous solution containing a surface active agent or alcohol be used so as not to hurt the disk base during the cleaning of the surface thereof. These disk rotating jig and cleaning means may be stored and transported separately from the storage container according to the present invention. In order to meet the convenience of a user, the jig and cleaning means are preferably housed in the storage container according to the present invention. For example, as shown in FIG. 2, the thickness of the storage container 7 is set somewhat larger than that of the cartridge type optical disk 1, and a hollow storage space is provided on a storage surface 11, which is on the opposite side of the storage surface 8 provided with the shutter stopper 9 and disk rotating projection 10. The disk rotating jig 12 and cleaning means 13 may be stored in this hollow space. In the storage hollow, the cleaning agent-impregnated cleaning means may be wrapped and housed, and the cleaning means and cleaning agent may be separately housed.

According to the present invention, the storage container is not specially limited to the above-described construction, and providing a handle for facilitating the opening and closing of the shutter, without changing the general design of the invention is also included in the technical scope of the present invention. The material out of which this storage container is formed is preferably a soft plastic in view of the safety, lightness, handling convenience (for example, the non-slippery property) and suitability with respect to the manufacturing conditions.

The storage container according to the present invention can be transported safely without damaging the cartridge type optical disk.

Moreover, this storage container permits a disk base to be cleaned even during the transportation thereof, and is generally serviceable as a very convenient portable optical disk storage container.

A structure for preventing the dislocation of a spring will now be described with reference to the accompanying drawings.

FIG. 3 shows the condition of a cartridge side spring contacting portion of a conventional structure of this kind. FIG. 4 shows a spring dislocation preventing projection provided on a lower wall in accordance with the techniques of the present invention. FIGS. 5 and 6 shows the condition viewed in the direction of the arrows in (from the left-hand portions of) FIGS. 3 and 4.

In a conventional cartridge, the contacting portion, with which a free portion of a spring is engaged, of one case 21b alone is provided with walls 33, 34 at the upper and lower portions thereof, and the free end portion of the spring is inserted from an opening 35 into and held in the space between these walls. However, when the cartridge is dropped as referred to above, the spring comes off in many cases from the opening 35 due to the impact force.

According to the present invention, a spring dislocation preventing projection 36 is provided on a lower wall 34, so that the spring does not come off even when a considerably large impact is imparted thereto. The shape of this dislocation preventing projection is not specially limited, and it may be formed to the same width as the lower wall 34 as shown in FIG. 6. The height of this projection is preferably set as large as possible in view of the spring dislocation preventing effect. Accordingly, the length of the opening (spring inserting portion) 35 may be set to a required minimum level, i.e., substantially equal to the diameter of the free end portion of the spring. This dislocation preventing projection 16 can be molded integrally with a case by using a metal mold obtained by suitably modifying a conventional metal mold.

According to the present invention, the construction of the part of the contacting portion which is other than the spring dislocation preventing projection 36 is not specially limited, and the construction of the contacting portion as a whole may be identical with that of a conventional contacting portion as shown in FIGS. 5 and 6. The construction of the contacting portion of the other case 21a may be determined suitably in accordance with the shape of the free end portion of the spring so that the inserting of the spring and the dislocation thereof can be done easily and prevented effectively, respectively.

A contacting portion 31, i.e. the free end portion of the sliding jig 24 is also preferably formed as described above, for example, as shown in FIGS. 7 and 8.

Even when the optical disk cartridge provided with a spring dislocation preventing structure according to the present invention is dropped by mistake, the spring does not come off, so that this cartridge is very useful in practice. When a conventional optical disk cartridge which was not provided with a spring dislocation preventing spring was subjected to a 3-30 time drop test, the spring came off all times, whereas, when an optical disk cartridge according to the present invention was subjected to a 30 time drop test, no problems arose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A book case type optical disk container for housing a cartridge type optical disk, the optical disk having a movable shutter and a rotatable optical disk base, said storage container comprising first and second storage portions pivotally connected to one another, the first and second storage portions being movable relative to one another to open and close the storage container, the cartridge type optical disk being positionable in the storage container and being completely enclosed by the first and second storage portions when the storage container is closed, the first storage portion having a rigid, nonmovable shutter stopper and a projection provided on the first storage portion, the shutter stopper maintaining the shutter of the optical disk in an open position and the projection rotatably supporting the optical disk base when the optical disk is in the storage container, the optical disk base being exposed when the shutter is in the open position, the shutter stopper comprising an elongated projection affixed to the first storage portion and an opening being provided in the optical disk having a predetermined length when the shutter is in the open position, the elongated projection having a length which is slightly less than the length of the opening of the optical disk.

2. The book case type optical disk storage container according to claim 1, further comprising a readily detachable disk rotating jig and readily detachable cleaning device mountable on an inside surface of one of the storage portions, said disk rotating jig being engageable with the optical disk to rotate the optical disk base and the cleaning device being used to clean the optical disk.

3. The book case type optical disk storage container according to claim 2, wherein the one storage portion to which the disk rotating jig and cleaning device are detachably mounted is the second storage portion, the first and second storage portions having generally flat sides which are spaced from one another by a predetermined distance when the storage container is closed to form a space between the optical disk and the flat side of the second storage portion, the disk rotating jig and the cleaning device being held in the space when mounted on the second storage portion.

4. The book case type optical disk storage container according to claim 1, wherein the optical disk base has a hub with a centrally disposed bore, the projection on the first storage portion being inserted into the bore of the hub when the optical disk is placed in the storage container.

5. A book case type optical disk container for housing a cartridge type optical disk, the optical disk having a movable shutter and a rotatable optical disk base, said storage container comprising first and second storage portions pivotally connected to one another, the first and second storage portions being movable relative to one another to open and close the storage container, the cartridge type optical disk being positionable in the storage container and being completely enclosed by the first and second storage portions when the storage container is closed, the first storage portion having a rigid, nonmovable shutter stopper and a projection provided on the first storage portion, the shutter stopper maintaining the shutter of the optical disk in an open position and the projection rotatably supporting the optical disk base when the optical disk is in the storage container, the optical disk base being exposed when the shutter is in the open position, the book case optical disk storage container further comprising a readily detachable disk rotating jig and readily detachable cleaning device mountable on an inside surface of one of the storage portions, said disk rotating jig being engageable with the optical disk to rotate the optical disk base and the cleaning device being used to clean the optical disk, the one storage portion to which the disk rotating jig and cleaning device are detachably mounted is the second storage portion, the first and second storage portions having generally flat sides which are spaced from one another by a predetermined distance when the storage container is closed to form a space between the optical disk and the flat side of the second storage portion, the disk rotating jig and the cleaning device being held in the space when mounted on the second storage portion, the optical disk base has a hub and the disk rotating jig has an opening provided therein for insertion over the hub to permit manual rotation of the optical disk base, the cleaning device being used to clean the optical disk base during the manual rotation thereof, the second storage portion providing ready access to the disk rotating jig and the cleaning device when the storage container is open.

6. The book case type optical disk storage container according to claim 5, wherein the hub of the optical disk base has a centrally disposed bore, the projection on the first storage portion being insertable into the bore of the hub when the optical disk is placed in the storage container.

7. The book case type optical disk storage container according to claim 5, wherein the shutter stopper comprises an elongated projection.

* * * * *